Figure 4:
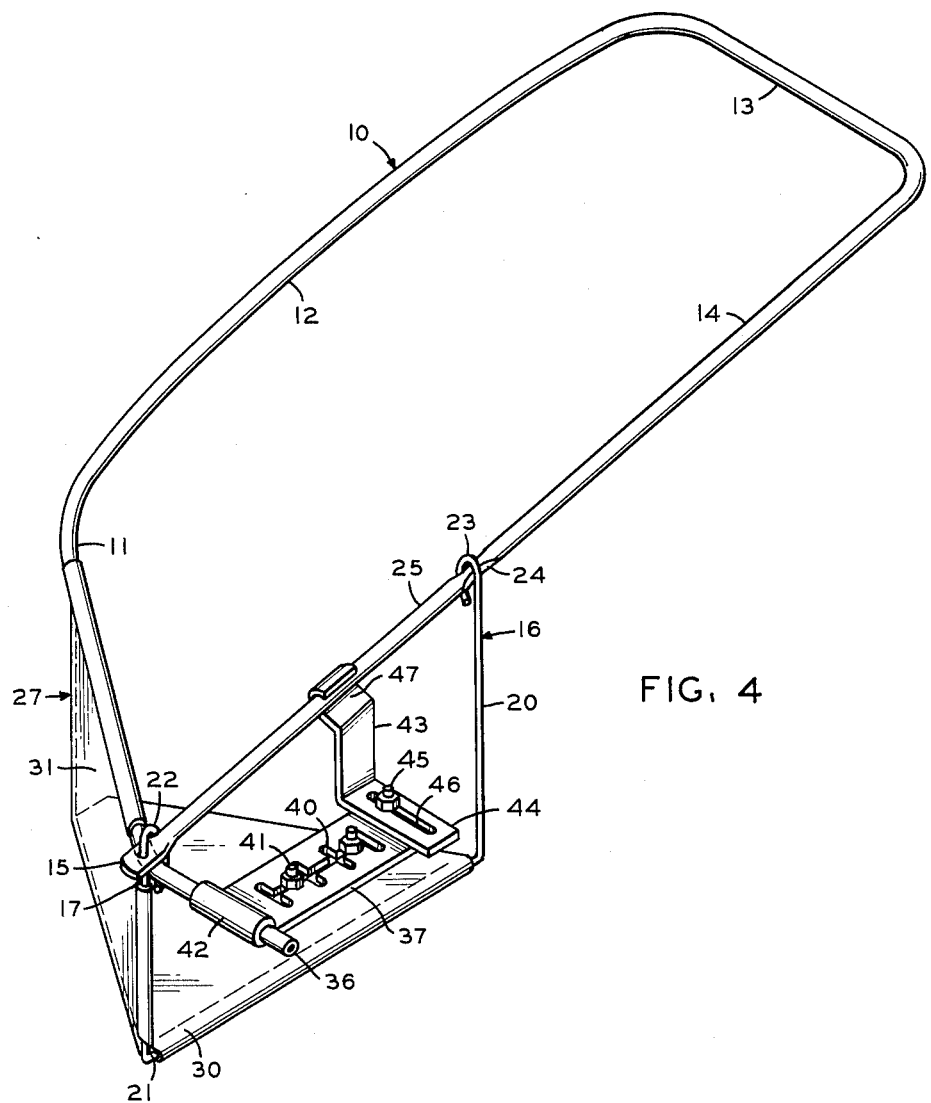

June 28, 1966  H. W. PIRIE  3,257,788
GRASS CATCHER AND MOUNTING THEREFOR
Filed Nov. 20, 1963  2 Sheets-Sheet 1
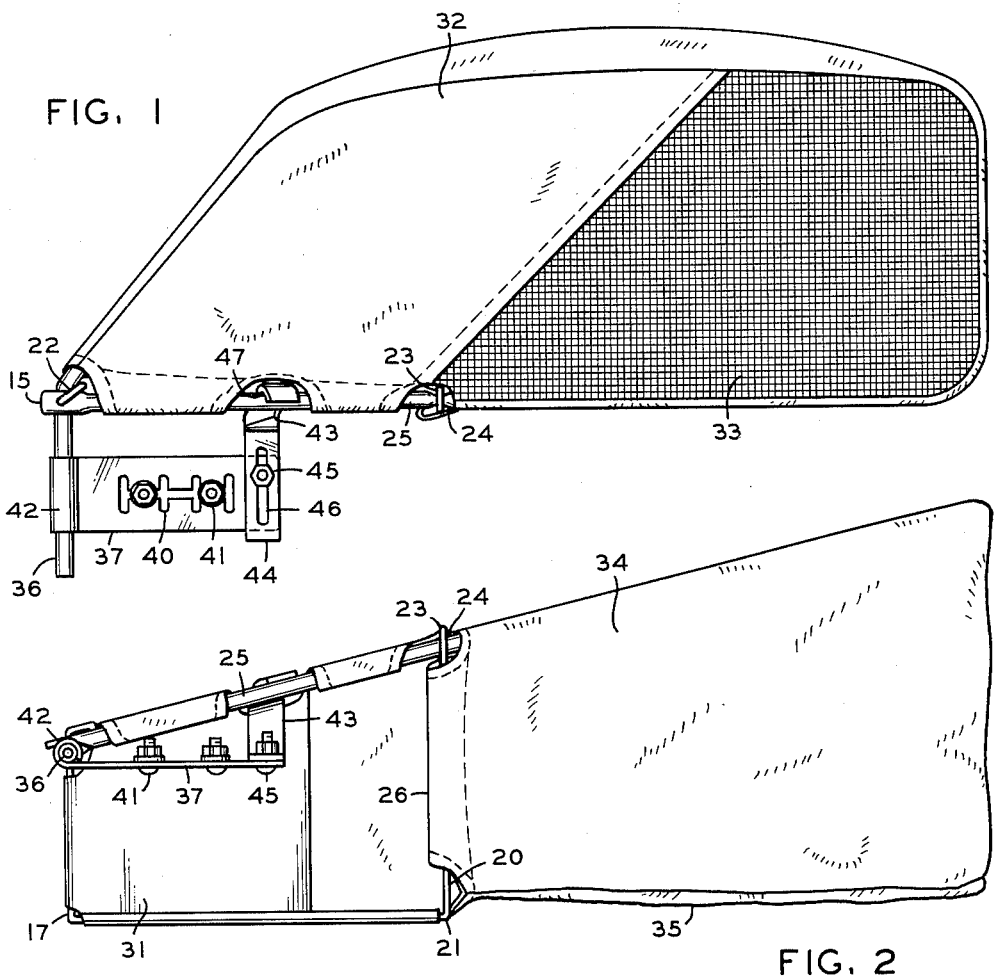
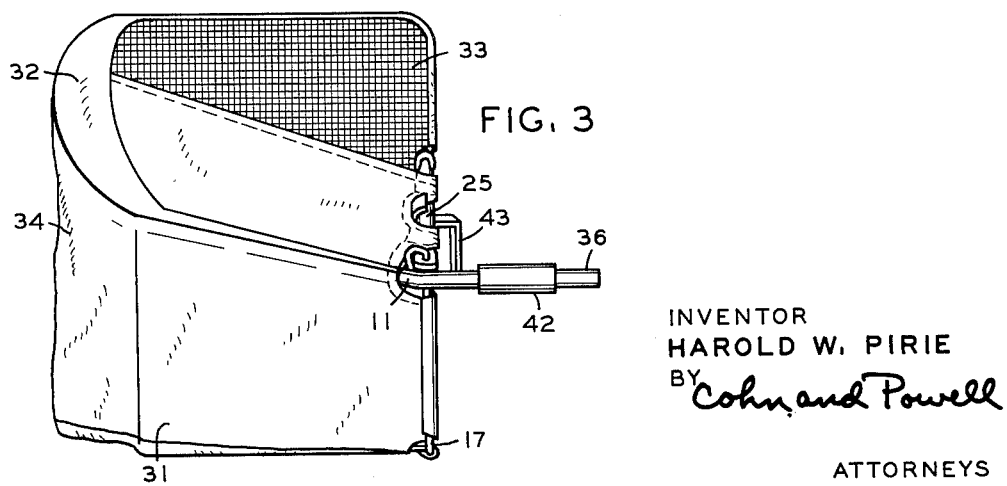
INVENTOR
HAROLD W. PIRIE
BY Cohn and Powell
ATTORNEYS June 28, 1966 H. W. PIRIE 3,257,788
GRASS CATCHER AND MOUNTING THEREFOR
Filed Nov. 20, 1963 2 Sheets-Sheet 2

INVENTOR
HAROLD W. PIRIE
BY *Cohn and Powell*
ATTORNEYS

United States Patent Office 3,257,788
Patented June 28, 1966

3,257,788
GRASS CATCHER AND MOUNTING THEREFOR
Harold W. Pirie, St. Louis, Mo., assignor to The Perfection Manufacturing Company, St. Louis, Mo., a corporation of Missouri
Filed Nov. 20, 1963, Ser. No. 324,975
13 Claims. (Cl. 56—202)

This invention relates generally to improvements in a grass catcher, and more particularly to improvements in the construction of the catcher and its mounting to a mower housing.

An important objective is achieved by the provision of means pivotally mounting a top frame to the mower housing, a second frame secured to the top frame and defining a side opening, material such as fabric secure to the top frame and second frame to provide a container, and means supporting the top frame in a rearwardly inclined position.

Another important object is realized in that the top frame is elongate and generally four-sided having a front portion, an outer side portion, a rear portion and an inner side portion, the top frame extending generally in a fore and aft direction of the mower housing.

Still another important object is provided by the provision of a bracket including a sleeve adapted to be secured to the mower housing, the sleeve pivotally mounting and receiving a projecting rod of the top frame so that the catcher can be swung and so that the rod can be inserted or withdrawn selectively incident to attachment or detachment from a support frame or arm.

An important object is afforded in that the front portion of the top frame has a projecting end that is slidably and pivotally mounted in the bracket sleeve, and in that an arm operatively yet selectively interconnects the bracket and top frame to hold the top frame in a rearwardly inclined position and to preclude unintentional withdrawal and disconnection of the frame end from the sleeve.

Another important object is achieved in that one side portion is received in a socket of the support arm and maintained in connection as a result of the resilient and flexible character of the top frame when the frame end is fitted in the bracket sleeve, the top frame being selectively disconnected from the support arm by flexing or moving the top frame laterally until the side portion is removed from the socket.

Other important advantages are realized by the structure of the top frame by an elongate and continuous rod bent to form a generally four-sided or rectangular shape.

An important object is provided by a bottom plate attached to the bottom of the second frame and extending inwardly of the container at the side opening and below the top frame, and by a front plate attached to the front portion of the top frame, the front plate extending inwardly opposite the side opening. These plates cooperate to afford a rigid structure in the region of attachment to the mower housing.

It is an important objective to provide a grass catcher that is simple and durable in construction, economical to manufacture, highly efficient in operation, and which can be easily installed and utilized by anyone with little or no instructions.

The foregoing and numerous other objects and advantages of the invention will more clearly appear from the following detailed description of a preferred embodiment, particularly when considered in connection with the accompanying drawings, in which:

FIG. 1 is a top plan view of the grass catcher;
FIG. 2 is a side elevational view;
FIG. 3 is a front elevational view, and
FIG. 4 is a perspective view of the frame assembly.

Referring now by characters of reference to the drawings, it is seen that the top frame generally indicated at 10 is an elongate, generally rectangular or four-sided shape. Specifically, the top frame 10 is constructed of a tubular rod bent in a substantially endless or continuous form to provide a rearwardly and outwardly extending front portion 11 interconnected with a rearwardly extending outer side portion 12, and a rear portion 13 interconnecting the outer side portion 12 with a forwardly extending inner side portion 14. The end 15 of the inner side frame portion 14 is pinned or otherwise secured to the front frame portion 11.

A substantially U-shaped wire referred to at 16 includes upstanding spaced arms 17 and 20 interconnected at the bottom by a transverse piece 21. The uppermost end 22 of wire arm 17 extends upwardly through aligned apertures formed in the front frame portion 11 and in the end 15 of the inner side portion 14, and looped over to secure these frame portions 11 and 14 together. The upper end 23 is looped over a pinched area 24 of the inner side frame portion 14 to secure the wire 16 in place.

It will be noted that the wire 16 and that part 25 of the inner side frame 14 extending between the wire arms 17 and 20 cooperate to provide a second frame that defines a side opening 26 (FIG. 2) through which grass cuttings are discharged from the discharge chute of a mower housing (not shown). The second frame is disposed substantially at a right angle to and below the top frame 10 at its forward inner side.

To achieve a rigid structure in the region of the side opening 26 and in the region of connection of the grass catcher to the mower housing, an angular plate generally indicated at 27 is utilized to interconnect the top frame 10 with the second frame. This angular plate 27 includes a bottom plate 30 secured to the web piece 21 of U-shaped wire 16, the bottom plate 30 extending inwardly of the catcher behind the side opening 26 and below the top frame 10. The plate 27 includes also an integral front plate 31 extending upwardly from the bottom plate 30 and secured to the front frame portion 11 and to the wire arm 17, the front plate 31 extending rearwardly and outwardly from the wire arm 17 to the point directly opposite the side opening 26.

From FIGS. 1–3, it is seen that flexible material such as a fabric or plastic sheet is attached to and carried by the top frame 10 and second frame 16 to form a container having the side opening 26. In the embodiment illustrated, the fabric is sewn to the top frame 10 to provide a top wall 32. A screen 33 is placed in the top wall 32 at the rear to allow for the escape of air and to provide a more effective packing of the grass cuttings into the container. The fabric extends down from the top frame 10 to provide a peripheral wall 34, the forward edges of which are secured to the wire arm 20 and to the front plate 31. The peripheral wall 34 is secured to a fabric bottom 35 the forward edge of which is fastened to the bottom plate 30. Sufficient material is provided in the pheripheral fabric wall 34 so that the container has a volume that gradually increases rearwardly. In other words, when the top frame 10 is held in the usual upwardly and rearwardly inclined position as illustrated in FIG. 2, the fabric bottom 35 will be substantially horizontal.

The end 36 of front frame portion 11 projects beyond the inner side frame portion 14 and beyond the substantially vertical second frame partially defined by U-shaped wire 16. The frame end 36 is disposed substantially at a right angle to the vertical plane provided by the U-shaped wire 16 and the side frame portion 14.

A bracket 37 is adapted to be attached to the mower housing at the top of the discharge chute. The bracket 17 is provided with a series of interconnected slots 40 in order that the bracket 37 may be adjusted on the mower housing to a desired position so that the side opening 26 of the catcher is aligned directly and accurately with the discharge chute of the mower housing. A plurality of bolts and nuts 41 are utilized to fix the bracket 37 in place, the bolts extending upwardly through the mower housing and upwardly through the bracket slots 40.

A sleeve 42 is formed on one end of bracket 37, the sleeve 42 slidably receiving and pivotally mounting the projecting frame end 36. It will be apparent that the catcher can be swung about the pivot axis defined by the interfitting connection of frame end 36 in sleeve 42, such swinging movement being in a substantially vertical plane.

When mounted, a support means serves to hold the top frame 10 in a rearwardly inclined position and to maintain the container in its open condition as illustrated in FIGS. 1–3. This support means includes an arm 43 having an integral foot 44 that seats on top of the bracket 37. A bolt and nut 45 extending through the bracket 37 and through an elongate slot 46 formed in the arm foot 44 securely fastens the arm 43 to the bracket 37, the bolt 45 being relatively movable selectively along the slot 46 to adjust the lateral position of such arm 43. The upper end of arm 43 is bent to provide a socket 47 that receives the top frame part 25. When the top frame part 25 is located in the arm socket 47, the top frame 10 is maintained in the rearwardly inclined position to hold the container open.

It is thought that the functional results of this grass catcher have become fully apparent from the foregoing detailed description of parts, but for completeness of disclosure, the installation and usage of the catcher will be briefly described.

First, the support arm 43 is fastened loosely by bolt 45 to the bracket 37. Then, the bracket 37, together with the support arm 43, is disposed over the top edge of the mower discharge chute opening and the bracket 37 is attached to the mower housing by the bolts 41 that extend upwardly through the mower housing and through the bracket slots 40. The position of the support arm 43 is adjusted laterally so that the catcher will clear the mower wheel when the frame part 25 is placed in the arm socket 47. When the support arm 43 is so located with the arm socket 47 located outwardly of the mower wheel, the support arm 43 is securely attached by tightening bolt 45.

To install the catcher, the frame end 36 is slidably fitted into the bracket sleeve 42 while the catcher is held slightly forward and upward so that the top frame clears the support arm 43. Then the catcher is pulled or swung downward and backward so that the frame part 25 drops into the arm socket 47 the top frame 10 pivotally moving about the axis defined by frame end 36 in the bracket sleeve 42.

The catcher is now ready for use. The support arm 43 holds the container open by maintaining the top frame 10 in the rearwardly inclined position and maintains the pivotal connection of the frame end 36 with the bracket sleeve 42 by precluding lateral movement outwardly of the top frame 10.

The grass cuttings are discharged from the mower housing into the side opening 26 and thence into the container, the clippings being packed first at the rear of the container as the result of the air flow through the screen 33. When the container is filled, it can be conveniently detached from the mower in order to be emptied.

To detach the catcher, the top frame 10 is gripped and moved laterally inward as permitted by the flexible character of the top frame 10 until the frame part 25 is removed from the arm socket 47. Then, the top frame 10 is swung upwardly about the pivot axis defined by frame end 36 in bracket sleeve 42 until the top frame 10 and particularly the frame part 25 clears the support arm 43. The frame end 36 can then be slidably removed from the bracket sleeve 42 by a lateral translatory movement of the top frame 10 and consequently of the complete catcher. After the catcher is emptied, it can be easily replaced as described previously.

Although the invention has been described by making detailed reference to a single preferred embodiment, such detail is to be understood in an instructive, rather than in any restrictive sense, many variants being possible within the scope of the claims hereunto appended.

I claim as my invention:

1. A grass catcher comprising:
   (a) a generally four-sided top frame including a front portion, an outer side portion, a rear portion and an inner side portion,
   (b) a second frame secured to the top frame and defining a side opening through which grass is discharged from a mower housing,
   (c) means pivotally mounting the top frame for movement substantially in a vertical plane about an axis located substantially at a right angle to the plane of the second frame,
   (d) means supporting the top frame in a rearwardly inclined position, and
   (e) flexible material secured to the top frame and the second frame to provide a container.

2. A grass catcher comprising:
   (a) an elongate top frame adapted to extend generally in a fore and aft direction relative to a mower housing,
   (b) a second frame attached to and depending from the top frame, the second frame defining a side opening through which grass is discharged from the mower housing,
   (c) a flexible material secured to the top frame and second frame to provide a container,
   (d) a bracket including a sleeve adapted to be secured to the mower housing,
   (e) the top frame having a rod portion pivotally mounted in the sleeve, and
   (f) means supporting the top frame while pivotally mounted.

3. A grass catcher as defined abovein claim 2, in which:
   (g) the rod portion and cooperating sleeve define a pivot axis extending substantially at a right angle to the plane of the second frame to enable swinging movement of the top frame and container in substantially a vertical plane extending generally in the fore and aft direction.

4. A grass catcher as defined above in claim 2, in which:
   (g) the last said means includes an arm operatively interconnecting the bracket and the top frame to support the top frame in a rearwardly inclined position.

5. A grass catcher comprising:
   (a) an elongate top frame extending generally in a fore and aft direction, the top frame including a front portion connected to an outer side portion, and a rear portion interconnecting the outer side portion with an inner side portion,
   (b) a second frame attached to and depending from the top frame and defining a side opening,
   (c) flexible material secured to both frames to provide a container,
   (d) the front portion of the top frame having an end projecting beyond the side opening defined by the second frame,
   (e) a bracket including a sleeve in which the projecting frame end is pivotally mounted, and (f) an arm operatively yet selectively interconnecting the bracket and top frame to hold the top frame in a rearwardly inclined position and to preclude unintentional withdrawal and disconnection of the frame end from the sleeve.

6. A grass catcher as defined above in claim 5, in which:
(g) the arm is attached to the bracket, the arm including a socket member open to receive the inner side portion of the top frame to hold the top frame in the rearwardly inclined position and to preclude unintentional withdrawal and disconnection of the frame end from the sleeve, the top frame being resilient and tending to maintain the inner side portion in the arm socket, yet the inner side portion being selectively movable out of the arm socket to release the top frame for withdrawal of the frame end from the sleeve.

7. A grass catcher as defined above in claim 5, in which:
(g) the arm is attached to the bracket, the arm including a member embracing the inner side portion of the top frame to hold the top frame in a rearwardly inclined position and to preclude unintentional withdrawal and disconnection of the frame end from the sleeve, the inner side portion being selectively movable out of the member to release the top frame and to enable withdrawal of the frame end from the sleeve.

8. A grass catcher as defined above in claim 5, in which:
(g) the top frame is a substantially continuous member,
(h) means to secure the forwardmost end of the inner side portion to the front portion,
(i) the top frame is flexible and movable in a lateral direction while the frame end is pivotally mounted in the bracket sleeve,
(j) the arm is attached to the bracket, the arm including a side-open socket receiving the inner side portion of the top frame to hold the top frame in the rearwardly inclined position and to preclude unintentional withdrawal and disconnection of the frame end from the sleeve, the flexible character of the top frame tending to hold the inner side portion in the arm socket, yet the top frame being selectively movable laterally to remove the inner side portion from the arm socket to release the top frame for pivotal movement and for withdrawal of the frame end from the sleeve.

9. A grass catcher as defined above in claim 5, in which:
(g) a bottom plate is attached to the bottom of the second frame and extends inwardly of the side opening below the top frame.

10. A grass catcher as defined above in claim 5, in which:
(g) the front portion of the top frame extends outwardly and rearwardly, and
(h) a front plate is attached to and depends from the front portion and extends inwardly opposite to the side opening.

11. A grass catcher as defined above in claim 5, in which:
(g) the front portion of the top frame extends outwardly and rearwardly to the outer side portion, and
(h) an angular plate including a bottom plate portion is attached to the bottom of the second frame and extends inwardly of the side opening below the top frame, and includes a front plate portion attached to and depending from the front portion of the top frame and extends inwardly opposite to the side opening.

12. A grass catcher comprising:
(a) a generally four-sided frame including a rearwardly and outwardly extending front portion connected to a rearwardly extending outer side portion, and a rear portion connecting the outer side portion with a forwardly extending inner side portion,
(b) a second frame attached to and depending from the top frame, the second frame being substantially in line with the inner side portion of the top frame and defining a side opening through which grass is discharged from a mower housing,
(c) material secured to the top frame and to the second frame to provide a container,
(d) the front portion of the top frame having its end projecting beyond and substantially at a right angle to the plane of the second frame,
(e) a bracket adapted to be secured to the mower housing the bracket including a sleeve slidably and rotatively receiving the projecting frame end, and
(f) an arm secured to the bracket, the arm including a socket receiving the inner side portion of the top frame to hold the top frame in position and to preclude withdrawal of the frame end from the bracket sleeve, the top frame being selectively movable to remove the inner side portion from the socket member and clear the arm and subsequently movable to withdraw the frame end from such sleeve.

13. A grass catcher, comprising:
(a) an elongate top frame adapted to extend generally in a fore and aft direction relative to a mower housing,
(b) a second frame attached to the top frame, the second frame defining a side opening through which grass is discharged from the mower housing,
(c) a flexible material secured to the top frame and second frame to provide a container,
(d) means pivotally mounting the top frame for movement in a plane about an axis located transversely of the plane of the second frame, and adapted to be secured to the mower housing, and
(e) means supporting the top frame while pivotally mounted.

References Cited by the Examiner
UNITED STATES PATENTS

| | | | |
|---|---|---|---|
| 2,932,146 | 4/1960 | Campbell | 56—202 |
| 2,970,421 | 2/1961 | Krewson | 56—202 |
| 2,970,422 | 2/1961 | Kroll et al. | 56—202 |
| 3,132,457 | 5/1964 | Slemmons | 56—202 |

ANTONIO F. GUIDA, *Acting Primary Examiner.*

RUSSELL R. KINSEY, *Examiner.*